United States Patent Office 3,111,544
Patented Nov. 19, 1963

3,111,544
PURIFICATION OF p,p'-ISOPROPYLIDENE-
DIPHENOL CRYSTALLINE PRODUCT
George G. Joris, Madison, and Zalik Oser, Morris Township, Morris County, N.J., assignors to Allied Chemical Corporation, New York, N.Y., a corporation of New York
No Drawing. Filed May 10, 1960, Ser. No. 27,995
7 Claims. (Cl. 260—619)

This invention relates to the purification of p,p'-isopropylidenediphenol crystalline product.

p,p'-Isopropylidenediphenol has become increasingly important in many areas of application. It is particularly valuable as an intermediate in the manufacture of resinous products such as polycarbonates. Polycarbonate resins find utility in lenses, instrument windows, oil sight gauges and transparent appliance parts.

A typical procedure for producing p,p'-isopropylidenediphenol crystalline product involves reacting phenol and acetone in liquid phase a temperature of about 20° to 80° C. in the presence of a strong mineral acid such as hydrochloric acid. Conversion of the phenol and acetone is carried to the point at which a slurry of p,p'-isopropylidenediphenol crystals in liquid medium is formed. The crystals, consisting of a complex of p,p'-isopropylidenediphenol and phenol, are recovered from the liquid medium by centrifuging and are then heated in vacuum to distill phenol from the desired p,p'-isopropylidenediphenol crystalline product. Such product is generally contaminated with color bodies of a yellowish hue.

The suitability of p,p'-isopropylidenediphenol in many applications is dependent upon its degree of purity. For example, when used in the production of polycarbonate resins, it is often required that the p,p'-isopropylidenediphenol be substantially water-white in appearance.

An object of this invention is to remove color bodies from p,p'-isopropylidenediphenol crystalline product. Another object is to remove color bodies from p,p'-isopropylidenediphenol crystalline product with high recovery of product. Other objects will be apparent from the following description.

Purification procedures presently available generally involve relatively complex and expensive procedures. Methods involving distillation techniques are usually incapable of producing a product substantially free of discoloration because of the retention in the p,p'-isopropylidenediphenol of relatively non-volatile materials and the adverse effect upon the product of the relatively high distillation temperature. Treatment of p,p'-isopropylidenediphenol crystalline product with solvents has been proposed but has been generally ineffectual in removing substantial amounts of color bodies.

It has now been discovered that color bodies may be removed from p,p'-isopropylidenediphenol crystalline product by reacting the product with isopropyl alcohol, treating the reaction mixture to form a slurry containing a crystalline complex of p,p'-isopropylidenediphenol and isopropyl alcohol and separating said complex from the slurry. The crystalline complex may then be dissociated into isopropyl alcohol and p,p'-isopropylidenediphenol crystals substantially free of color bodies.

The p,p'-isopropylidenediphenol crystalline product is first dissolved in isopropyl alcohol at temperature of about 25° to 80° C., preferably about 50° to 80° C. Although more dilute solutions may be prepared, the isopropyl alcohol is preferably employed in such amount as to form a saturated solution of the p,p'-isopropylidenediphenol. The composition of saturated solutions at temperatures in the range of 25° to 80° C. is set forth below:

| Temperature of Solution (° C.) | p,p-Isopropylidenediphenol in Saturated Solution (Approximate Weight Percent) |
|---|---|
| 25 | 32.5 |
| 30 | 35 |
| 35 | 37.5 |
| 40 | 40 |
| 45 | 42.5 |
| 50 | 45 |
| 55 | 48 |
| 60 | 51 |
| 65 | 54.5 |
| 70 | 58 |
| 75 | 62.5 |
| 80 | 67.0 |

Upon treatment of the solution in known manner to form crystals, as by cooling, vacuum evaporation or both, a slurry of crystals in isopropyl alcohol is formed. The crystallization procedure is generally carried out at temperature of about 25° to 50° C. The time period over which crystallization is effected should be sufficient to allow a rate of crystal formation of about 10 to 20 pounds per hour per cubic foot of reactor volume. As the rate of crystal formation is decreased, formation of desirable maximum size crystals is favored.

We have found that the crystals so formed comprise a new crystalline complex of p,p'-isopropylidenediphenol and isopropyl alcohol. This complex is bimolecular, containing one mol of isopropyl alcohol and one mol of p,p'-isopropylidenediphenol, and may be represented by the following formula:

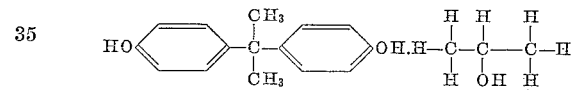

The crystalline complex has been found to possess an entirely different X-ray diffraction pattern from p,p'-isopropylidenediphenol crystals per se. Comparative X-ray diffraction data defining the four principal lines in the X-ray diagrams are set forth below:

| Crystalline Complex of p,p'-Isopropylidenediphenol and Isopropyl Alcohol | | | p,p'-Isopropylidenediphenol Crystals | | |
|---|---|---|---|---|---|
| 2θ Angle (Degrees) | D-Spacing (Angstrom Units) | Relative Intensity (Percent) | 2θ Angle (Degrees) | D-Spacing (Angstrom Units) | Relative Intensity (Percent) |
| 26.69 | 3.34 | 100 | 22.20 | 4.00 | 40 |
| 21.85 | 4.06 | 100 | 18.58 | 4.77 | 80 |
| 21.52 | 4.32 | 100 | 17.65 | 5.07 | 100 |
| 18.62 | 4.76 | 85 | 16.80 | 5.27 | 50 |

Moreover, the vapor pressure (mm. Hg) of isopropyl alcohol over the crystalline complex has been found to be 4.4 at 25° C., 25 at 50° C. and 141 at 75° C. At the same temperatures, pure isopropyl alcohol has a vapor pressure of 45, 175 and 570, respectively.

In preferred operation, the p,p'-isopropylidenediphenol crystalline product contaminated with color bodies is dissolved in isopropyl alcohol, preferably using the alcohol in such amount as to form a saturated solution at temperature of about 50° to 80° C. The solution is then evaporatd at temperature of about 25° to 50° C. and under vacuum, e.g. at pressure of about 25 to 325 mm.

Hg, to remove isopropyl alcohol and to form a slurry containing a crystalline complex of p,p'-isopropylidenediphenol and isopropyl alcohol. Particularly efficient operation is attained by employing constant temperature of about 50° C. during both the solution and evaporation steps.

Crystallization by vacuum evaporation overcomes the problem of product crystals sticking to cooling surfaces. This favorable behavior is due to crystal formation occurring at the boiling surface of the solution rather than principally at cooling surfaces as in conventional cooling.

Agitation supplementing ebullition is advantageous during evaporation. Hence we prefer to supplement agitation from ebullition by stirring, circulating through a pump, etc.

After its formation, the crystalline complex of p,p'-isopropylidenediphenol and isopropyl alcohol is separated from residual isopropyl alcohol, which retains the color bodies, by any suitable means such as filters or centrifuges. Centrifugal separation is preferred since it enables more efficient removal of the residual isopropyl alcohol from the complex.

The complex may then be dissociated into isopropyl alcohol and p,p'-isopropylidenediphenol crystals substantially free of color bodies by heating the complex at temperature of at least about 50° C., as in the range of about 50° to 100° C., at atmospheric pressure or under vacuum. The complex may also be dissociated at temperature below 50° C. by reducing the pressure below that at which the complex is stable or by passing an inert gas, such as nitrogen, carbon dioxide or air, through the complex. Dissociation is advantageously carried out under vacuum at temperature of about 70° to 80° C. The isopropyl alcohol is volatilized during the dissociation and may be condensed and then recovered.

Isopropyl alcohol recovered upon separation of the crystalline complex and dissociation of the complex may be recycled for further use in the process of this invention. When substantial impurities accumulate in the isopropyl alcohol, it may be purified before recycling.

By means of the recrystallization process of this invention, recovery of purified p,p'-isopropylidenediphenol crystalline product of at least 75% and purity in terms of A.P.H.A. (American Public Health Association) value of below 50 units (substantially water-white) and even below 35 units (water-white) are readily obtained. Such purified product finds acceptance in any application, as in the production of polycarbonate resins.

Although the crystalline product containing color bodies may be subjected to a plurality of treatments with isopropyl alcohol, it has been found that a single treatment is generally adequate to produce substantially water-white crystals.

Numerous solvents conventionally used in the purification of p,p'-isopropylidenediphenol crystalline product have been tested, but none has given the combination of high recovery and low A.P.H.A. value obtained by use of isopropyl alcohol. Although we do not wish our invention to be limited by any theory, we believe that the crystals of the complex p,p'-isopropylidenediphenol and isopropyl alcohol, under their formation, exclude color bodies present in the p,p'-isopropylidenediphenol and hence yield, upon separation and dissociation, remarkably pure p,p'-isopropylidenediphenol.

The A.P.H.A. test referred to involves measuring the intensity of light transmitted through an acetone solution of crystalline p,p'-isopropylidenediphenol product. This test may be carried out using a Lumetron colorimeter model 401–E, provided with a B–420 filter and a 150 mm. sample holder. The colorimeter is standardized against reagent grade acetone. 100 grams of a sample of crystalline p,p'-isopropylidenediphenol is dissolved in reagent grade acetone to make up 200 ml. total solution. The sample is placed in the sample holder, and the scale reading at the balance point is taken. The A.P.H.A. value of the sample is read directly from a calibration curve which is drawn from values obtained using known solutions of a platinum-cobalt color standard. Details of making up suitable A.P.H.A. testing solutions can be found at pages 14 and 15 of Standard Methods for Examination of Water and Sewage, 9th ed., 4th printing (1951), American Public Health Association. The p,p'-isopropylidenediphenol is said to have a certain number of A.P.H.A. "units," i.e., light transmission characteristics equivalent to the corresponding numbered A.P.H.A. test solution. Lower numbers correspond to increasingly purer samples.

An example of the process of this invention follows:

140 grams of p,p'-isopropylidenediphenol crystalline product having an A.P.H.A. value of 350 units were dissolved in 75 ml. of isopropyl alcohol by heating at 80° C. with agitation. The solution was then cooled to 30° C. under agitation over a period of about 2 hours to form a crystalline slurry of a complex of p,p'-isopropylidenediphenol and isopropyl alcohol. The complex comprised about 79% by weight of p,p'-isopropylidenediphenol and about 21% by weight of isopropyl alcohol. The complex was separated from the slurry by centrifuging and was then dissociated into isopropyl alcohol and final p,p'-isopropylidenediphenol product by heating at temperature of about 75° C. and pressure of about 130 mm. Hg, 105 grams of final product were obtained, representing a recovery of 75%. The final product had an A.P.H.A. value of 35 units and was substantially water-white in appearance.

When the above example was repeated, using various solvents in place of isopropyl alcohol, the following results were obtained.

| Solvent | Temp. of Solution (° C.) | Temp. of Centrifuging (° C.) | Percent Product Recovered | A.P.H.A. of final Product (Units) |
|---|---|---|---|---|
| Ethyl acetate | | 30 | 62 | 90 |
| n-Propyl alcohol | | 30 | 54 | 75 |
| Diisopropyl ether | | 30 | 25 | 230 |
| Ethylene dichloride | | 30 | 86 | 120 |
| Methyl ethyl ketone | | 30 | 75 | 85 |
| Ethyl alcohol | | 30 | 65 | 90 |
| Acetic acid | | 35 | 66 | 80 |
| Benzene | | 50 | 60 | 415 |
| Toluene | | 30 | 86 | 80 |

The final products obtained in the above tests were varying shades of yellow in appearance. None of the solvents formed a complex with p,p'-isopropylidenediphenol.

Numerous modifications of the invention will be apparent to those skilled in the art. Hence, the invention is to be deemed as limited only by the scope of the appended claims.

We claim:

1. A crystalline complex of p,p'-isopropylidenediphenol and isopropyl alcohol represented by the following formula:

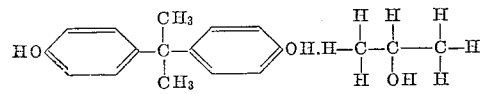

2. The process of removing color bodies from p,p'-isopropylidenediphenol crystalline product containing color bodies, said crystalline product being obtained by the reaction of phenol with acetone and being substantially free of complex of p,p'-isopropylidenediphenol and phenol, which comprises dissolving the product in isopropyl alcohol, subjecting the resulting solution to crystallization, thereby forming a slurry containing a crystalline complex of p,p'-isopropylidenediphenol and isopropyl alcohol and separating said complex substantially free of color bodies from the slurry.

3. The process of removing color bodies from p,p'-isopropylidenediphenol crystalline product containing color bodies, said crystalline product being obtained by the reaction of phenol with acetone and being substantially free of complex of p,p′-isopropylidenediphenol and phenol, which comprises dissolving the product in isopropyl alcohol, subjecting the resulting solution to crystallization, thereby forming a slurry containing a crystalline complex of p,p′-isopropylidenediphenol and isopropyl alcohol, separating said complex from the slurry and dissociating the complex into isopropyl alcohol and p,p′-isopropylidenediphenol crystals substantially free of color bodies.

4. The process of removing color bodies from p,p′-isopropylidenediphenol crystalline product containing color bodies, said crystalline product being obtained by the reaction of phenol with acetone and being substantially free of complex of p,p′-isopropylidenediphenol and phenol, which comprises dissolving the product in isopropyl alcohol, subjecting the resulting solution to crystallization, thereby forming a slurry containing a crystalline complex of p,p′-isopropylidenediphenol and isopropyl alcohol, separating said complex from the slurry and heating the complex at temperature of at least about 50° C. to dissociate it into isopropyl alcohol and p,p′-isopropylidenediphenol crystals substantially free of color bodies.

5. The process of removing color bodies from p,p′-isopropylidenediphenol crystalline product containing color bodies, said crystalline product being obtained by the reaction of phenol with acetone and being substantially free of complex of p,p′-isopropylidenediphenol and phenol, which comprises dissolving the product in isopropyl alcohol, evaporating the resulting solution under vacuum to remove isopropyl alcohol and to form a slurry containing a crystalline complex of p,p′-isopropylidenediphenol and isopropyl alcohol, separating said complex from the slurry by centrifuging and dissociating the complex into isopropyl alcohol and p,p′-isopropylidenediphenol crystals substantially free of color bodies.

6. The process of removing color bodies from p,p′-isopropylidenediphenol crystalline product containing color bodies, said crystalline product being obtained by the reaction of phenol with acetone and being substantially free of complex of p,p′-isopropylidenediphenol and phenol, which comprises preparing a saturated solution of the product in isopropyl alcohol at temperature of about 25° to 80° C., evaporating the solution under vacuum at temperature of about 25° to 50° C. to remove isopropyl alcohol and to form a slurry containing a crystalline complex of p,p′-isopropylidenediphenol and isopropyl alcohol, separating said complex from the slurry by centrifuging and heating the complex at temperature of about 50° to 100° C. to dissociate the complex into isopropyl alcohol and p,p′-isopropylidenediphenol crystals substantially free of color bodies.

7. The process of removing color bodies from p,p′-isopropylidenediphenol crystalline product container color bodies, said crystalline product being obtained by the reaction of phenol with acetone and being substantially free of complex of p,p′-isopropylidenediphenol and phenol, which comprises preparing a saturated solution of the product in isopropyl alcohol at temperature of about 50° to 80° C., evaporating the solution under vacuum at temperature of about 25° to 50° C. to remove isopropyl alcohol and to form a slurry containing a crystalline complex of p,p′-isopropylidenediphenol and isopropyl alcohol, separating said complex from the slurry by centrifuging and heating the complex under vacuum at temperature of about 70° to 80° C. to dissociate the complex into isopropyl alcohol and p,p′-isopropylidenediphenol crystals substantially free of color bodies.

References Cited in the file of this patent

UNITED STATES PATENTS

| | | |
|---|---|---|
| 2,493,781 | Schneider et al. | Jan. 10, 1950 |
| 2,623,908 | Stoesser et al. | Dec. 30, 1952 |
| 2,713,072 | Dannenberg | July 12, 1955 |
| 2,806,068 | Abrahams | Sept. 10, 1957 |
| 2,858,343 | Hoaglin et al. | Oct. 28, 1958 |
| 2,884,462 | Henry | Apr. 28, 1959 |
| 2,925,444 | Levine et al. | Feb. 16, 1960 |
| 2,959,622 | Gimme et al. | Nov. 8, 1960 |